United States Patent [19]

Murai

[11] 3,708,793

[45] Jan. 2, 1973

[54] VIDEO SIGNAL GENERATING SYSTEM

[75] Inventor: Tohru Murai, Odawara, Japan

[73] Assignee: Hitachi, Ltd., Chiyoda-ku, Tokyo, Japan

[22] Filed: Aug. 6, 1971

[21] Appl. No.: 169,679

[52] U.S. Cl. .....340/324 A, 178/DIG. 35, 315/27 GD

[51] Int. Cl. ....... G06f 3/14

[58] Field of Search .......340/324 A; 315/27 GD; 178/DIG. 35, 7.88

[56] References Cited

UNITED STATES PATENTS

| | | | |
|---|---|---|---|
| 3,284,658 | 11/1966 | Winfield | 340/324 A |
| 3,324,346 | 6/1967 | Stone | 340/324 A |
| 3,349,172 | 10/1967 | Mauchel | 340/324 A |
| 3,403,289 | 9/1968 | Garry | 315/27 GD |
| 3,457,365 | 7/1969 | Stokes, Jr. et al. | 178/7.88 |
| 3,560,644 | 2/1971 | Petrocelli et al | 178/DIG. 35 |

*Primary Examiner*—John W. Caldwell
*Assistant Examiner*—Marshall M. Curtis
*Attorney*—Craig, Antonelli and Hill

[57] ABSTRACT

A video signal generating system using a single cathode-ray tube for simultaneously scanning a plurality of character matrices to produce a plurality of video signal representing respective characters and selectively displaying only one of said video signals. It is provided with a gain compensating circuit for varying the gain of beam deflecting means for the cathode-ray tube to a value corresponding to a character matrix according to a select code representing the corresponding one of said plurality of character matrices.

2 Claims, 8 Drawing Figures

INVENTOR
TOHRU MURAI
BY Craig, Antonelli & Hill
ATTORNEYS

INVENTOR
TOHRU MURAI
BY Craig, Antonelli & Hill
ATTORNEYS

INVENTOR

TOHRU MURAI

BY Craig, Antonelli & Hill

ATTORNEYS

INVENTOR
TOHRU MURAI

BY Craig, Antonelli & Hill
ATTORNEYS

VIDEO SIGNAL GENERATING SYSTEM

BACKGROUND OF THE INVENTION

1. Field of the Invention

This invention relates to video signal generating systems.

2. Description of the Prior Art

Character video signal generating systems of the flying spot scanner type are well known in the art, in which digital codes representing characters to be displayed are converted into video signals representing the character patterns which are fed to a cathode-ray display tube for the display. In this type of systems, the characters or patterns which are used for the display are stored in the form of a matrix. However, the number of characters accommodated in a single matrix is limited by the aspects of resolution of and deflectional distortion in the character scanning cathode-ray tube (hereinafter referred to as CRT) and the stability of the associated circuitry. A single character matrix can contain about 300 characters or at most 600 characters in special cases. Therefore, many character matrices are required to provide several thousand characters as in the case of applying the system to the display of Chinese characters. If a plurality of CRT's are provided for the individual character matrices, the scale of the entire system becomes enormous. In practice, many lenses are provided to a single CRT for the respective character matrices, or a plurality of character matrices are simultaneously scanned with a single CRT through a mirror arrangement.

In either case, however, unless the plurality of character matrices have strictly the same dimensions, when the scanning area is set such as to properly scan a character in one character matrix corresponding characters in the other character matrices are not properly scanned. In such cases, some characters may be deviated to a corner of the scan area and other characters may be completely out of the scan area. Also, some of the displayed characters may be of reduced size.

In order to avoid these problems as much as possible, in the exposure step in the manufacture of the character matrices the type of optical system (lens system or mirror system) which is actually assembled into the signal generating system is used. With this method, however, the individual character matrices fabricated still have slightly different dimensions. This is thought to be partly due to the fact that the matrix films after the exposure undergo elongation to different extents during developing and drying treatments.

SUMMARY OF THE INVENTION

An object of the invention is to compensate for the irregular positioning and size of the displayed characters due to different dimensions of the plurality of the character matrices by means of circuitry associated with the CRT.

DESCRIPTION OF THE PREFERRED EMBODIMENT

Figures 1, 2:
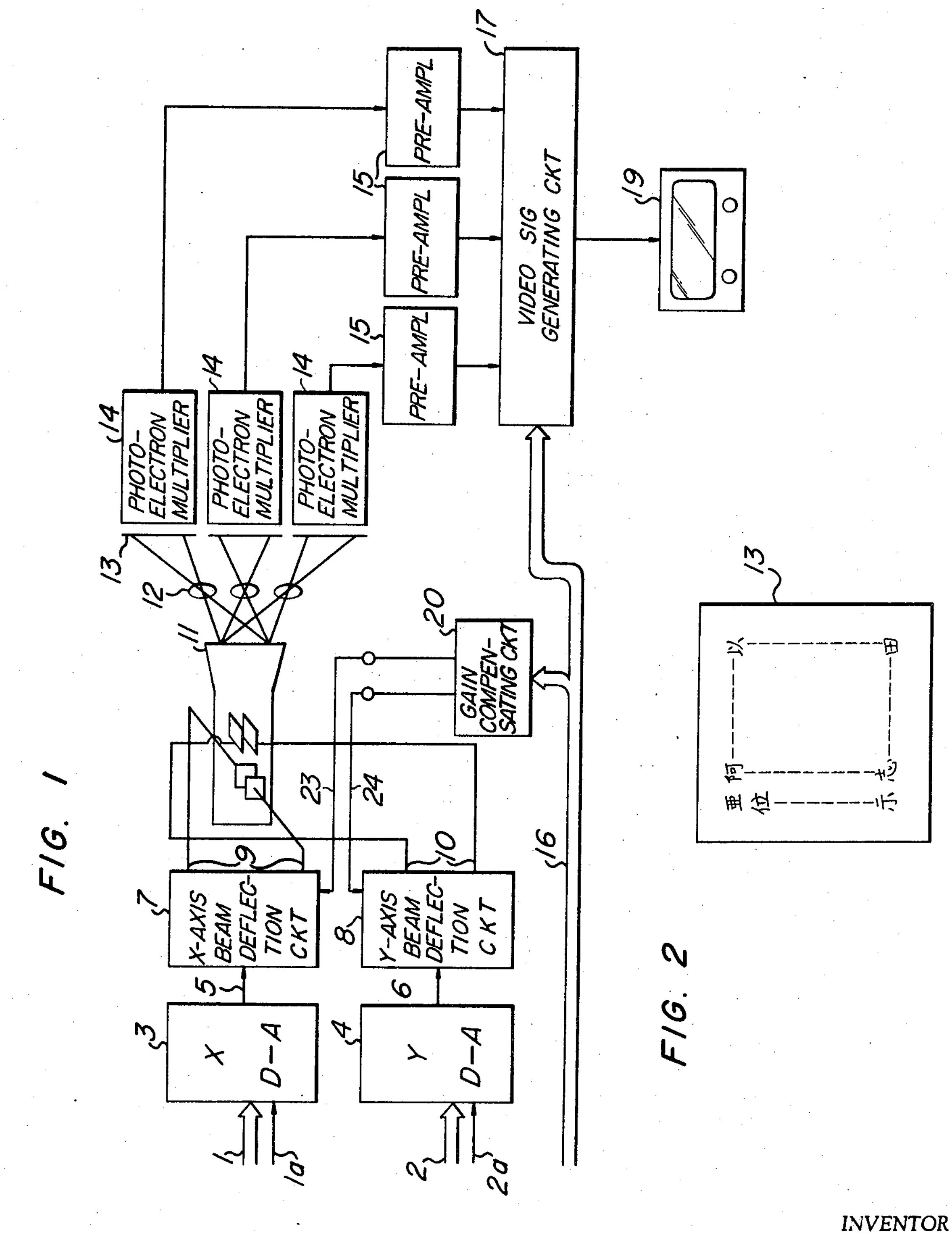
FIG. 1 is a block diagram showing a video signal generating system according to the invention.
FIG. 2 shows an example of the character plate (hereinafter referred to as character matrix).

Referring to FIG. 1, which shows a video signal generating system, numerals 1, 2 and 16 represent a set of digital codes representing a character to be displayed. The code 1 is fed to an X-axis digital-analog converter 3, the code 2 is fed to a Y-axis digital-analog converter 4, and the code 16 is fed to both a video signal switching circuit 17 and a gain compensating circuit 20. In the X-axis digital-analog converter 3, the code 1 is converted into an analog signal of a corresponding level, on which is superimposed an X-axis sub-deflection signal 1a, and the resultant signal voltage is amplified in the X-axis beam deflection circuit 7 for impression upon an X-axis deflection electrode in CRT 11. Similar parts are also provided for Y-axis deflection. Thus, the beam scanning of the face plate of the CRT takes place for a scanning area specified by the codes 1 and 2. As a result, through a plurality of lenses 12, the same number of character matrices 13, photoelectron multipliers 14 and pre-amplifiers 15 a plurality of different video signals are provided to the video signal switching circuit 17. The video signal switching circuit 17 selectively provides one of the video signals representing a predetermined character according to the code 16 for display on the display unit 19.

FIG. 2 shows an example of the character matrix. It is in the form of a film carrying matrix of characters formed by exposure and development. Video signals corresponding to the individual character patterns may be obtained by scanning this film. A single film can accomodate a set of alphabetical characters and a set of number figures, but a plurality of films are necessary to provide several thousand characters as in case of Chinese characters as mentioned earlier.

Figure 3A:
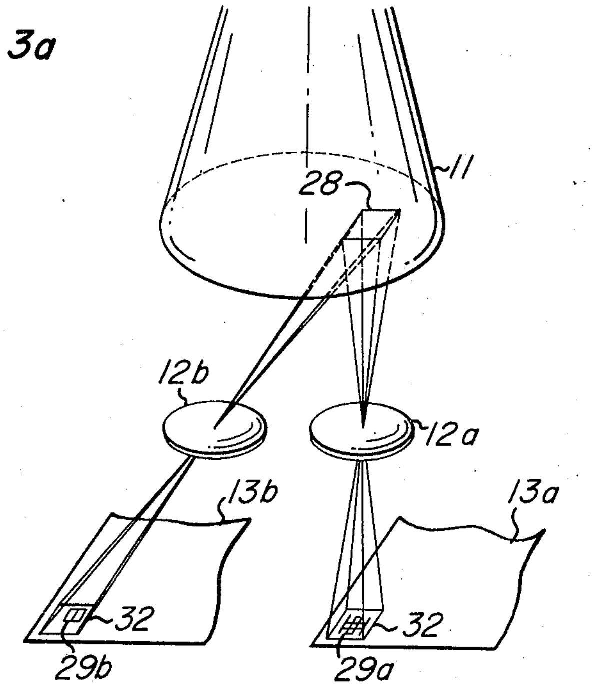
FIG. 3a schematically illustrates the scanning of character matrices.

FIG. 3a shows the manner of scanning a plurality of character matrices. Once a certain scanning area 28 in the CRT 11 is selected, corresponding portions 29a and 29b of the respective character matrices 13a and 13b in like positions thereof and having the same area 32 are scanned through respective lenses 12a and 12b. However, if the character matrix 13b is reduced in like positions thereof and having the same area 32 are scanned through respective lenses 12a and 12b. However, if the character matrix 13b is reduced in size with respect to the character matrix 13a,with the scanning area 28 selected in CRT 11 so as to properly scan, for instance, a character 29a in the character matrix 13a in the character matrix 13b of the reduced size the corresponding character 29b occupies a reduced proportion of the like portion of the same area. In such a case, while the character 29a is properly positioned with respect to the scan area 32, the character 29b is assuming a position rather deviated to the lower right of the corresponding scan area 32 and is reduced in size, as is seen from the comparison of FIGS. 3*b* and 3*c* to an enlarged scale. Thus, the resultant display is very poor, as shown in FIG. 4.

Figure 3B:
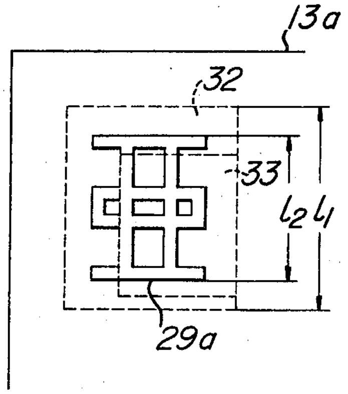
FIGS. 3b and 3c show the relation between a character being scanned and the scan area.
Figure 3C:
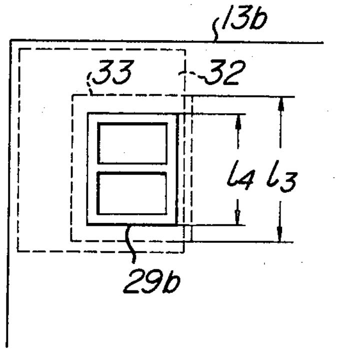
Figure 4:
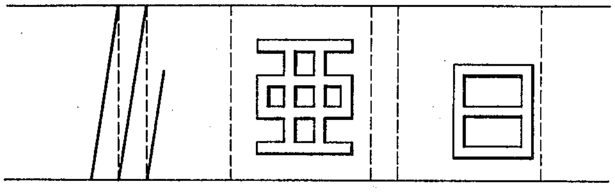
FIG. 4 shows characters being displayed which are different in size due to different sizes of corresponding character matrices.

To overcome this problem, the scan area 32 is set such as shown in FIG. 3*b* when scanning the character 29*a* in the character matrix 13*a* while it is set such as shown in FIG. 3*c* when scanning the character 29*a* in the character matrix 13*a*. In other words, the ratio between the length $l_1$ of the scan area 32 and the length $l_2$ of the character 29*a* is made equal to the ratio between the length $l_3$ of the scan area 33 and the length $l_4$ of the character 29*b*, and the scanning is made at the same frequency. By so doing, the characters on display may be aligned and have the same size. Although in the scanning of the character 29*a* of the character matrix 13*a* for the scan area 32 the character 29*b* of the character matrix 13*b* is also scanned with the same scan area 32, only the video signal representing the character 29*a* of the character matrix 13*a* is adapted to be selected. Similarly, though the character 29*a* of the character matrix 13*a* is scanned in the scan area 33 simultaneously with the scanning of the character 29*b* of the character matrix 13*a* in the same scan area 33, only the video signal representing the character 29*b* of the character matrix 13*b* is selected.

In the operation of the CRT, the X-axis and Y-axis beam deflection circuits for the deflection of the scanning beam have their gain varied according to the size of the selected character matrix. The gain may be varied to proper values for the individual character matrices by suitably pre-adjusting the circuit constants in the gain compensating circuit to appropriate values for the respective character matrices.

Figure 5:
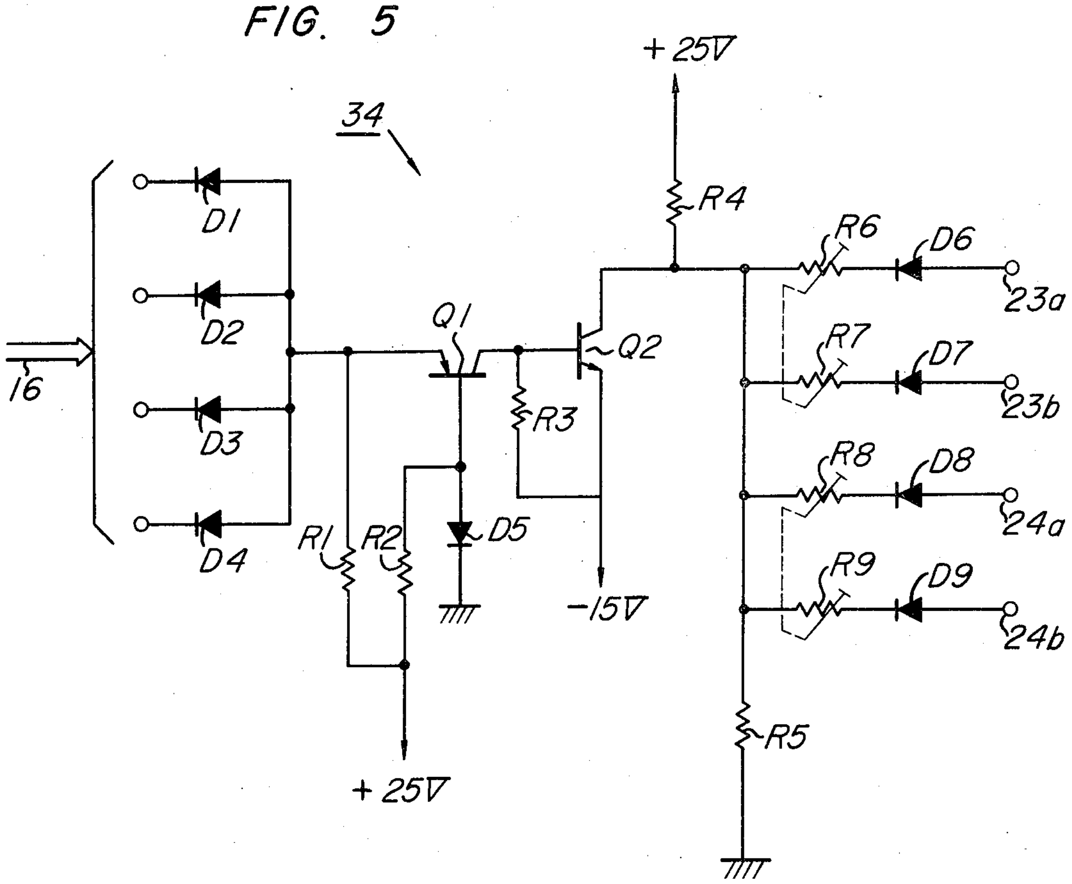
FIG. 5 is a circuit diagram showing an elementary circuit unit in a gain compensating circuit for the problems as shown in FIG. 4.
Figure 6:
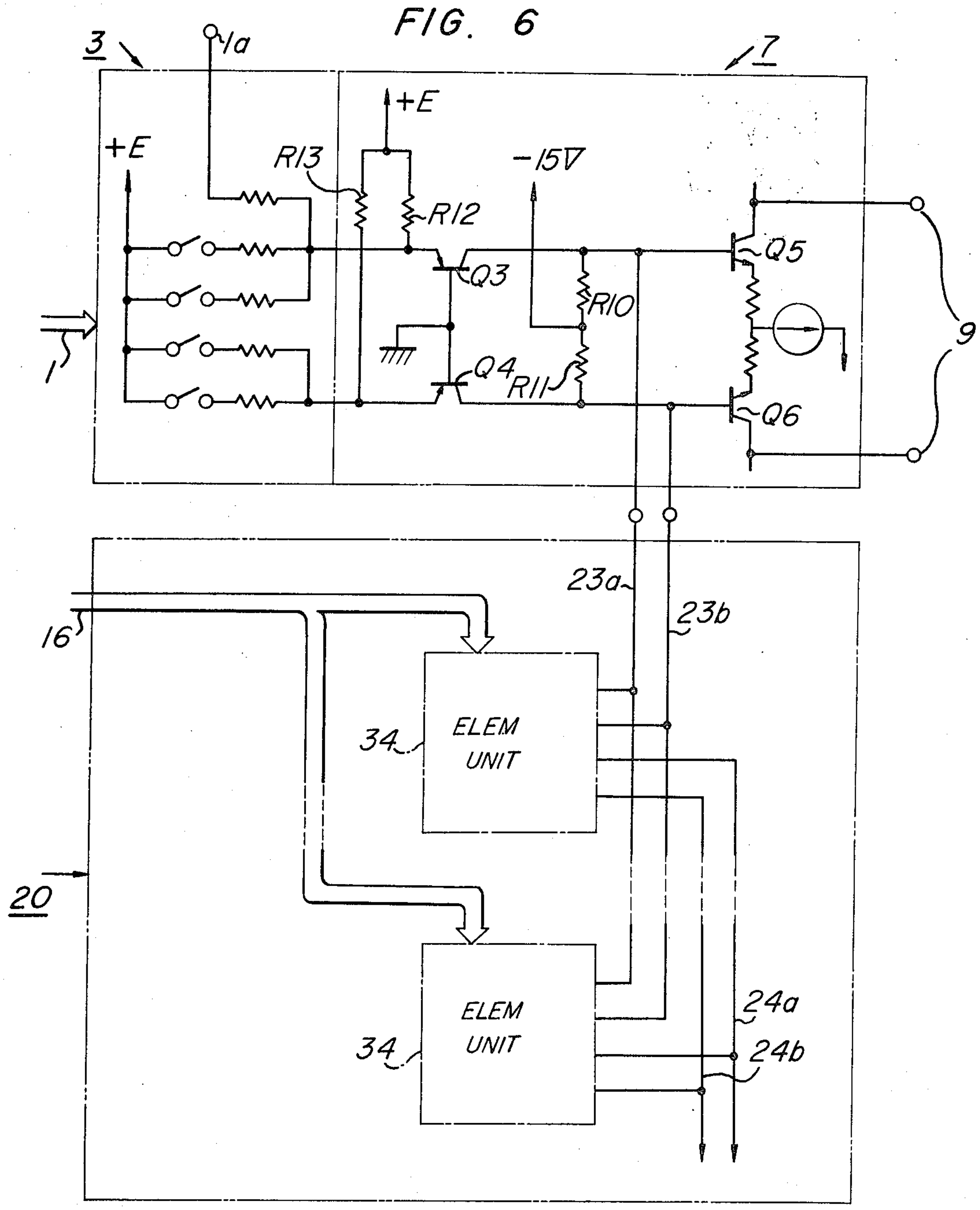
FIG. 6 shows, partly in block form, the gain compensating circuit according to the invention.

FIGS. 5 and 6 show an embodiment of the gain compensating circuit according to the invention.

FIG. 5 shows an example of the circuit construction of the elementary unit in the gain compensating circuit 20 shown in FIG. 1. The same number of the elementary units of FIG. 5 as the number of character matrices are combined together to construct the gain compensating circuit 20 as shown in FIG. 6. The gain compensating circuit 20 is connected to the X-axis and Y-axis beam deflection circuits 7 and 8 (the Y-axis beam deflection circuit 8 being omitted in FIG. 6).

Referring to FIG. 5, diodes D1 to D4 constitute an AND gate serving as a decoder to decode the input code 16. The gate signal from the AND gate is coupled to a level converter consisting of a transistor Q1 (hereinafter referred to as TQ1) converting the gate signal level to a value suitable for impression on the base of a succeeding stage switching transistor Q2 (hereinafter referred to as TQ2). Variable resistors R6 to R9 are adjustable to adjust the output voltages appearing at output terminals 23*a*, 23*b*, 24*a* and 24*b* when TQ2 is "on". Diodes D6 to D9 serve to block reverse current from a power supply of +25 volts when TQ2 is "off". If any one of the diodes D1 to D4 receives an input of a low level (substantially zero volts), the emitter and base potentials of TQ1 are substantially at the same level, so that TQ1 is "off". At this time, TQ2 is also "off" since its base potential is low. When TQ2 is "off", its collector potential is positive and slight as determined by voltage dividing resistors R4 and R5, and since the output terminal 23*a*, 23*b*, 24*a* and 24*b* are at negative potentials the diodes D6 and D9 are reversely biased and non-conductive. Thus, no output voltage appears at the output terminals 23*a*, 23*b*, 24*a* and 24*b*. When the AND condition of the AND gate of the diodes D1 to D4 is met by the character matrix selection code 16, that is, when all the inputs are at a high level (substantially +5 volts), current flows from a power supply of +5 volts to the emitter of TQ1, causing collector current therefrom substantially equal to the emitter current to be supplied to the base of the next-stage TQ2 to trigger the same. At this time, the collector potential of TQ2 becomes about −15 volts, thus forwardly biasing the diodes D6 to D9 to render them conductive. Thus, output appears at the output terminals 23*a*, 23*b*, 24*a* and 24*b*, which are connected to the respective variable resistors R6 to R9 through the respective diodes. In the above manner, when the AND gate is opened in accordance with the input code 16, regulated output voltages are obtained from the output terminals 23*a*, 23*b*, 24*a* and 24*b*. According to the output voltage thus obtained the gain of the X-axis and Y-axis beam deflection circuits 7 and 8 shown in FIG. 1. is corrected.

FIG. 6 shows the gain compensating circuit 20 comprising the same number of the elementary units described above as the number of the character matrices and the X-axis beam deflection circuit 7. In FIG. 6, the Y-axis beam deflection circuit is not shown for the sake of simplifying the illustration and description.

In FIG. 6, numeral 3 generally designates a current addition type digital-analog converter. Some of the switches in a group are closed according to the input combination of the character code 1. An input terminal 1a receives a sub-deflection sawtooth wave signal for determining the dimension of the character in the direction of the X-axis. Current provided from the digital-analog converter 3 is fed to the emitter of grounded-base transistors Q3 to Q4 in the X-axis beam deflection circuit 7, causing current substantially equal to the emitter current to flow from the collector of the transistor Q3 to Q4 through respective resistors R10 to R11 to a voltage source of −15 volts. At this time, the signal current from the digital-analog converter 3 is converted to a voltage signal through the resistors R10 and R11 for impression upon the base of the succeeding stage differential amplifier transistors Q5 and Q6. In this embodiment, the resistance of the resistors R10 and R11 determining the current-voltage conversion factor are equivalently varied to vary the gain of the X-axis beam deflection circuit 7. When one of the elementary units 34, equal in number to the number of the character matrices in the gain compensating circuit 20, is selected and its TQ2 is turned conductive, the variable resistors R6 and R7 of the selected elementary unit 34 in the gain compensating circuit 20 are added in parallel with the respective resistors R10 and R11 through the output terminals 23*a* and 23*b*. As a result, the gain of the X-axis beam deflection circuit 7 is reduced, and the deflection output 9 thereof is impressed on the X-axis deflection electrode of the CRT 11. Thus, the deflection angle of the CRT 11 is reduced. The variable resistor R6 and R7 are set such that the resultant gain just meets the X-axis dimension of the corresponding character matrix. The gain correction in the direction of the Y-axis is similar to that in the direction of the X-axis, so will not be described. In the preceding embodiment the gain is increased only in one direction, but it will be apparent that the gain may be corrected for both directions by having a slightly adjusted state as a reference stage and adjusting the individual gains with respect to the reference state.

As has been described in the foregoing, according to the invention it is possible to compensate for irregular positioning and size of characters on display due to different dimensions of respective characters by electrically or electronically effecting the gain correction for respective character matrices or like patterns equivalent thereto.

I claim:

1. A video signal generating system comprising:

a. a plurality of matrices of characters;

b. a cathode-ray tube for simultaneously scanning said plurality of matrices of characters, c. X-axis and Y-axis digital-analog converters converting a code for a character to be displayed into an analog signal representing the scanning area of said cathode-ray tube;

d. X-axis and Y-axis beam deflection circuits for causing the scanning of a selected area of said cathode-ray tube according to the outputs of said digital-analog converters;

e. a plurality of means to produce video signals representing scanned characters in said individual matrices of characters responsive to said scanning of said selected area;

f. a video signal switching circuit to selectively deliver only one of said video signals by selecting one of said video signal producing means in accordance with a code signal representing a character to be displayed; and g. a gain compensating circuit for varying the gain of said beam deflecting circuits according to said code representing a character to be displayed to thereby compensate the scanning area of said cathode-ray tube according to the matrix in which the selected character appears.

2. A video signal generating system according to claim 1, wherein said gain compensating circuit comprises a plurality of gain variation units each including:

a. a decoder to decode a character code;

b. a transistor on-off controlled by the output of said decoder; and c. parallel load resistors connected to said transistor; said load resistors being in series with respective diodes controlled by said transistor; the output of said gain variation units being coupled to said beam deflection circuits to control the gain of said gain deflection circuits.

* * * * *